United States Patent
Inuzuka

(10) Patent No.: US 9,755,490 B2
(45) Date of Patent: Sep. 5, 2017

(54) POWER TOOL

(71) Applicant: MAKITA CORPORATION, Anjo-shi (JP)

(72) Inventor: Junya Inuzuka, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 441 days.

(21) Appl. No.: 14/527,050

(22) Filed: Oct. 29, 2014

(65) Prior Publication Data

US 2015/0180307 A1    Jun. 25, 2015

(30) Foreign Application Priority Data

Dec. 25, 2013 (JP) .................. 2013-267667

(51) Int. Cl.
*H02K 1/28* (2006.01)
*H02K 15/03* (2006.01)
*B25F 5/00* (2006.01)
*H02K 1/27* (2006.01)
*H02K 7/04* (2006.01)
*H02K 9/06* (2006.01)
*H02K 15/12* (2006.01)

(52) U.S. Cl.
CPC ............. *H02K 15/03* (2013.01); *B25F 5/00* (2013.01); *B25F 5/008* (2013.01); *H02K 1/276* (2013.01); *H02K 1/28* (2013.01); *H02K 7/04* (2013.01); *H02K 9/06* (2013.01); *H02K 15/12* (2013.01)

(58) Field of Classification Search
CPC .......... H02K 7/145; H02K 1/274; H02K 1/28; H02K 15/03
See application file for complete search history.

(56) References Cited

U.S. PATENT DOCUMENTS

| 4,954,736 A * | 9/1990 | Kawamoto | H02K 1/278 310/156.21 |
| 5,864,191 A | 1/1999 | Nagate et al. | |
| 6,225,724 B1 * | 5/2001 | Toide | H02K 1/276 310/156.53 |
| 6,630,762 B2 * | 10/2003 | Naito | H02K 15/03 310/156.53 |

(Continued)

FOREIGN PATENT DOCUMENTS

| CN | 1848614 A | 10/2006 |
| CN | 102165677 A | 8/2011 |

(Continued)

OTHER PUBLICATIONS

Unpublished U.S. Appl. No. 14/481,237.
Extended European Search Report from the European Patent Office dated May 22, 2015 in related EP application No. 14 19 1107.3, including European Search Opinion, European Search Report, and examined claims 1-11.

(Continued)

*Primary Examiner* — Dang Le
(74) *Attorney, Agent, or Firm* — J-Tek Law PLLC; Jeffrey D. Tekanic; Scott T. Wakeman

(57) ABSTRACT

A power tool includes a housing and a brushless motor, the brushless motor having a stator and a rotor inside the housing, the rotor including a rotor core having a plurality of axially extending through holes and a permanent magnet in each of the plurality of through holes. The rotor is provided with at least one positioning structure by which the rotor core can be held in a desired circumferential orientation while the permanent magnets are inserted into the through holes.

20 Claims, 9 Drawing Sheets

(56) References Cited

U.S. PATENT DOCUMENTS

| | | | |
|---|---|---|---|
| 6,803,690 B2 * | 10/2004 | Bosch | H02K 1/2726 310/154.21 |
| 6,819,022 B2 | 11/2004 | Yamamoto et al. | |
| 8,421,282 B2 | 4/2013 | Ota | |
| 8,933,605 B2 * | 1/2015 | Jiang | H02K 1/278 310/156.47 |
| 2001/0030480 A1 * | 10/2001 | Matsunobu | H02K 1/276 310/156.53 |
| 2005/0200223 A1 * | 9/2005 | Tajima | H02K 1/2766 310/156.46 |
| 2006/0273679 A1 | 12/2006 | Iwase et al. | |
| 2007/0126305 A1 * | 6/2007 | Okuma | H02K 1/276 310/156.53 |
| 2011/0043057 A1 | 2/2011 | Ota | |
| 2011/0227430 A1 | 9/2011 | Omori et al. | |
| 2013/0076197 A1 | 3/2013 | Asaga et al. | |
| 2015/0069864 A1 | 3/2015 | Nagahama et al. | |

FOREIGN PATENT DOCUMENTS

| | | |
|---|---|---|
| EP | 2849316 A2 | 3/2015 |
| JP | 2004007869 A | 1/2004 |
| JP | 2007209178 A | 8/2007 |
| JP | 2009254065 A | 10/2009 |
| JP | 2011045201 A | 3/2011 |
| JP | 2011231940 A | 11/2011 |

OTHER PUBLICATIONS

Office Action from the Chinese Patent Office mailed Oct. 9, 2016 in related Chinese application No. 201410553595.3, and machine translation of substantive portions thereof.

Office Action from the Japanese Patent Office mailed Mar. 28, 2017 in counterpart Japanese application No. 2013-267667, and machine translation of substantive portions thereof.

* cited by examiner

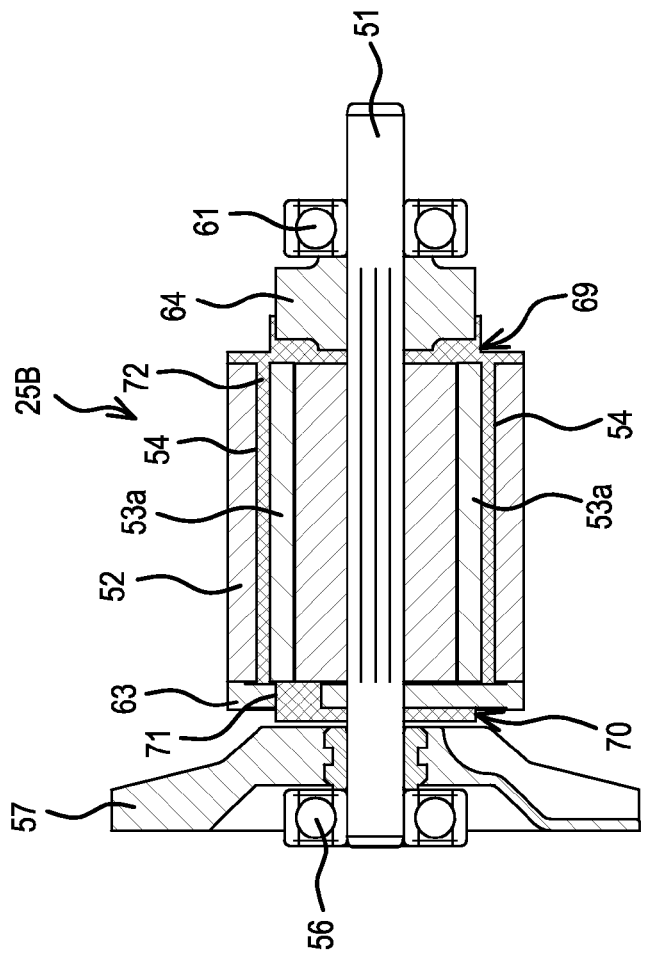
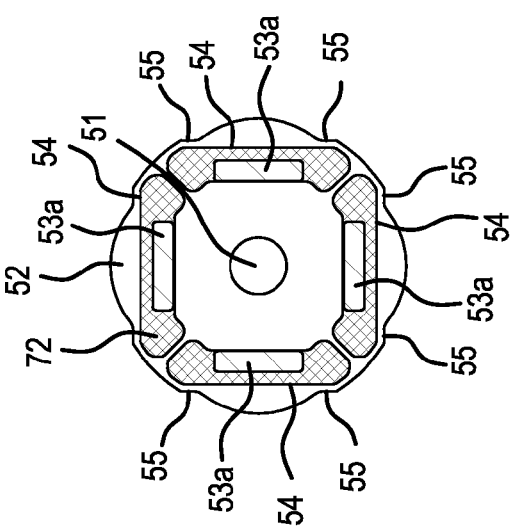
FIG.7B
FIG.7A

POWER TOOL

CROSS-REFERENCE TO RELATED APPLICATION

The present application claims priority to Japanese patent application serial number 2013-267667 filed on Dec. 25, 2013, the contents of which are incorporated fully herein.

TECHNICAL FIELD

The present disclosure is directed to a power tool having a brushless motor as a drive source.

BACKGROUND ART

A compact and highly durable brushless motor may be used as a drive source in a power tool, a hammer driver-drill, for example. An example of a suitable brushless motor is disclosed in U.S. Pat. No. 6,819,022 (and family member Japanese Laid-open Patent Publication 2004-007869). This type of brushless motor includes a rotor disposed on the inner side of a stator, and the rotor comprises a rotor core formed from a stack of steel laminations. The motor includes a motor shaft that extends through the center of the rotor core and that is integrated (made integral) with the rotor core, and a plurality of permanent magnets are affixed to the rotor core.

SUMMARY OF THE DISCLOSURE

In an alternate rotor configuration, permanent magnets may be inserted into axial through holes formed in the rotor core and integrated (made integral) with the rotor core by using an adhesive. However, because the transverse cross section of the rotor core is circular (and therefore has no directionality), it is difficult to position the magnets correctly. Consequently, it may be necessary to create positioning pin holes or similar structures in the inner diameter or inner surface of the rotor core, and this in turn increases the cost of manufacturing and assembling the rotor.

Accordingly, an object of the present disclosure is to provide a power tool having a brushless motor with a rotor core configured to make the positioning of the rotor core easier and to facilitate the insertion of permanent magnets into the rotor core.

In a first aspect of the disclosure, a power tool houses a brushless motor which motor comprises a stator and a rotor inside a housing. A rotor core of the rotor includes a plurality of through holes, and a permanent magnet is inserted into each through hole of the plurality of through holes (i.e. a plurality of permanent magnets are respectively inserted into a plurality of through holes defined in the rotor core). The rotor is provided with one or more positioning parts that allow (enable) the rotor core to be held in a desired circumferential orientation while the permanent magnets are inserted into the through holes.

According to a second aspect of the disclosure, one or more of the positioning parts may be one or more chamfer parts provided or formed (defined) on or in an outer-circumferential surface of the rotor core.

According to a third aspect of the disclosure, one or more of the positioning parts may be one or more recessed grooves provided or formed (defined) on or in an outer-circumferential surface of the rotor core.

A fourth aspect of the disclosure is a power tool that houses a brushless motor comprising a stator and a rotor inside a housing. A rotor core of the rotor includes a plurality of through holes, and a permanent magnet is inserted into each through hole of the plurality of through holes (i.e. a plurality of permanent magnets are respectively inserted into a plurality of through holes defined in the rotor core). One or more chamfer parts are provided or formed in or on an outer circumference of the rotor core.

A fifth aspect of the disclosure is a power tool that includes a housing and a brushless motor in the housing. The brushless motor includes a stator and a rotor, the rotor having a longitudinal axis of rotation and a rotor core that includes a plurality of axially extending through holes (i.e. a plurality of permanent magnets are respectively inserted into a plurality of through holes defined in the rotor core). A permanent magnet is mounted in each of the plurality of through holes. The rotor core has a radially outer surface that is non-circular when viewed in cross section perpendicular to the axis of rotation.

A further aspect of the disclosure comprises a power tool having a housing and a brushless motor in the housing. The brushless motor includes a stator, a rotor having a longitudinal axis of rotation and a rotor core having a plurality of axially extending through holes and a permanent magnet in each of the plurality of through holes. The rotor core has a radially outer surface that is non-circular when viewed in cross section perpendicular to the axis of rotation. The outer surface includes at least two axially extending concavities by which the rotor core can be held in a desired circumferential orientation while the permanent magnets are inserted into the through holes, and the rotor core, when viewed in cross section perpendicular to the axis of rotation, comprises first and second pairs of opposed arc sections, circumferentially adjacent arc sections of the first and second pairs of arc sections being separated by one of the at least two axially extending concavities. The rotor core further includes at least one convexity between the concavities and between the circumferentially adjacent arc sections of the first and second pairs of arc sections. Furthermore, portions of the permanent magnets may extend into the convexities.

Using positioning parts as described above and hereinafter simplifies the accurate positioning of the rotor core and makes the insertion of the permanent magnets into the rotor core easier.

BRIEF DESCRIPTION OF THE DRAWINGS

These and other aspects and features of the present disclosure will be better understood after a reading of the following detailed description together with the attached drawings in which:

FIGS. 7A and 7B are a transverse cross-sectional view of a rotor integrally molded with injection molded magnet material and a longitudinal cross-sectional view of the rotor, respectively.

DETAILED DESCRIPTION OF EMBODIMENTS

Embodiments of the present disclosure are explained below, with reference to the accompanying drawings.

Figure 1:
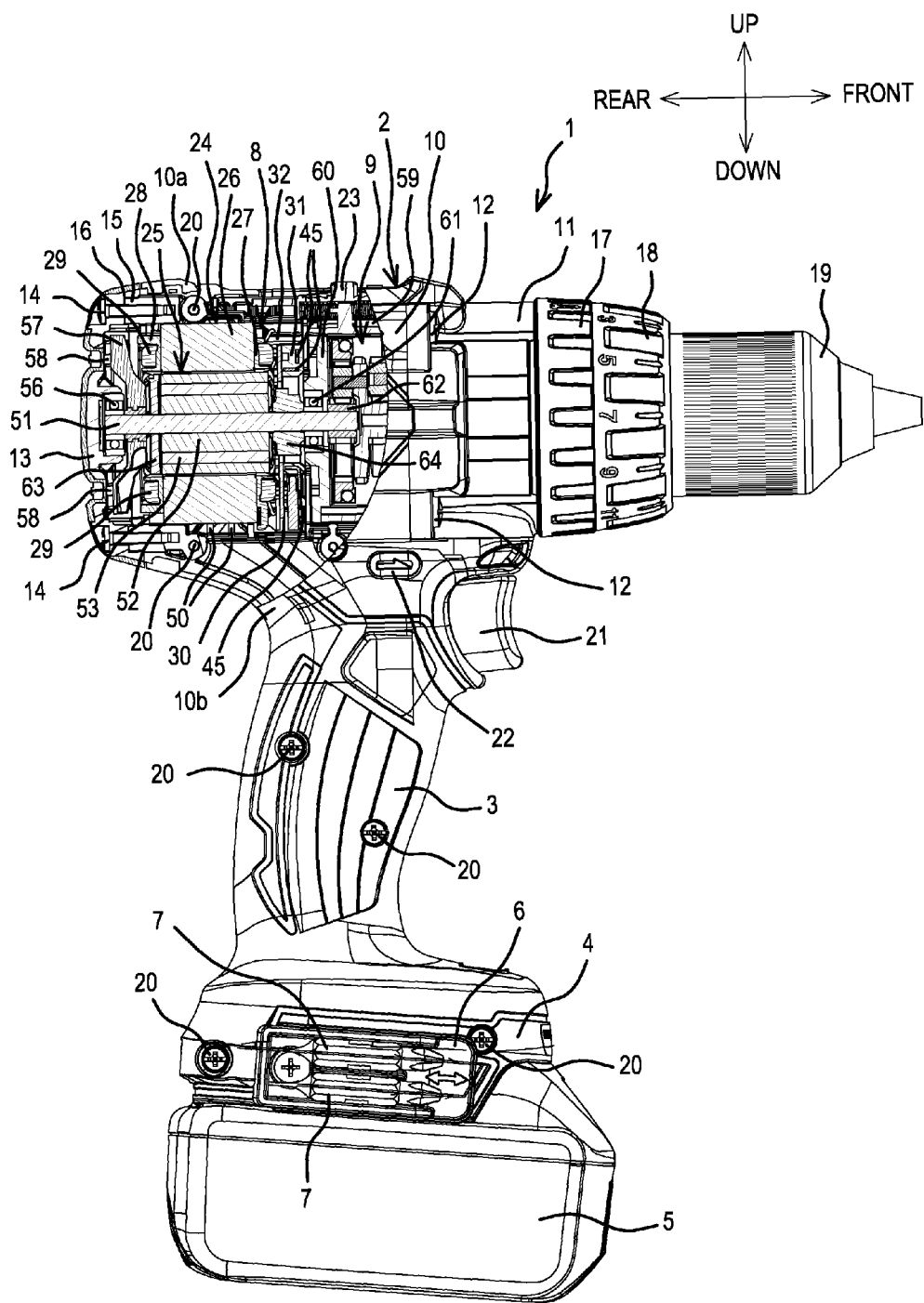
FIG. 1 is side elevational view, partly in section, of a driver-drill according to a representative, non-limiting embodiment of the present disclosure.

FIG. 1 is an overall view of a hammer driver-drill having a T shape that is formed by a handle 3 extending in a downward direction from a main body 2, which main body 2 extends in a front-rear direction. A battery pack 5, which serves as a power supply, is mounted onto a mounting part 4 at a lower end of the handle 3. In addition, a housing part 6 for holding bits 7 is formed on a side of the mounting part 4.

A housing of the main body 2 is formed by assembling a tubular main body housing 10, a front housing 11 and a cap housing 13 as described below. The front housing 11 houses a clutch mechanism, a hammer mechanism, and a spindle, and is connected at the front (the right side in FIG. 1) of the tubular main body housing 10. The main body housing 10 houses a brushless motor 8 and a planetary-gear speed-reducing mechanism 9, and is connected to the front housing 11 via screws 12 screwed in from the front. The cap housing 13 is connected onto the rear of the main body housing 10 via screws 14 at two locations (upper and lower), which screws 14 are screwed in from the rear. The coupling surfaces between the main body housing 10 and the cap housing 13 constitute a socket-and-spigot joint formed by ring-shaped (annular) protruding parts 15 at the rear surface of the main body housing 10 and recessed parts 16 formed in a front surface of the cap housing 13. The protruding parts 15 each include a screw boss having a longitudinal bore into which a corresponding screw 14 is screwed to secure the cap housing 13 on the main body housing 10.

In addition, a mode-changing ring 17 and a clutch-adjusting ring 18 are provided forward of the front housing 11, and a chuck 19, which is mounted on the spindle, is provided forward of the clutch-adjusting ring 18. Furthermore, the handle 3 is configured such that it is continuous with the main body housing 10, and the handle 3 and the main body housing 10 are formed by assembling (joining) left and right half housings 10a, 10b via screws 20. Reference numeral 21 is a trigger that is provided to actuate a switch housed in the handle 3; reference numeral 22 is a motor forward/reverse-changing button; and reference numeral 23 is a speed-changing lever. A light (not illustrated) is located above the trigger 21 and provides illumination forward of the chuck 19.

Figure 2:
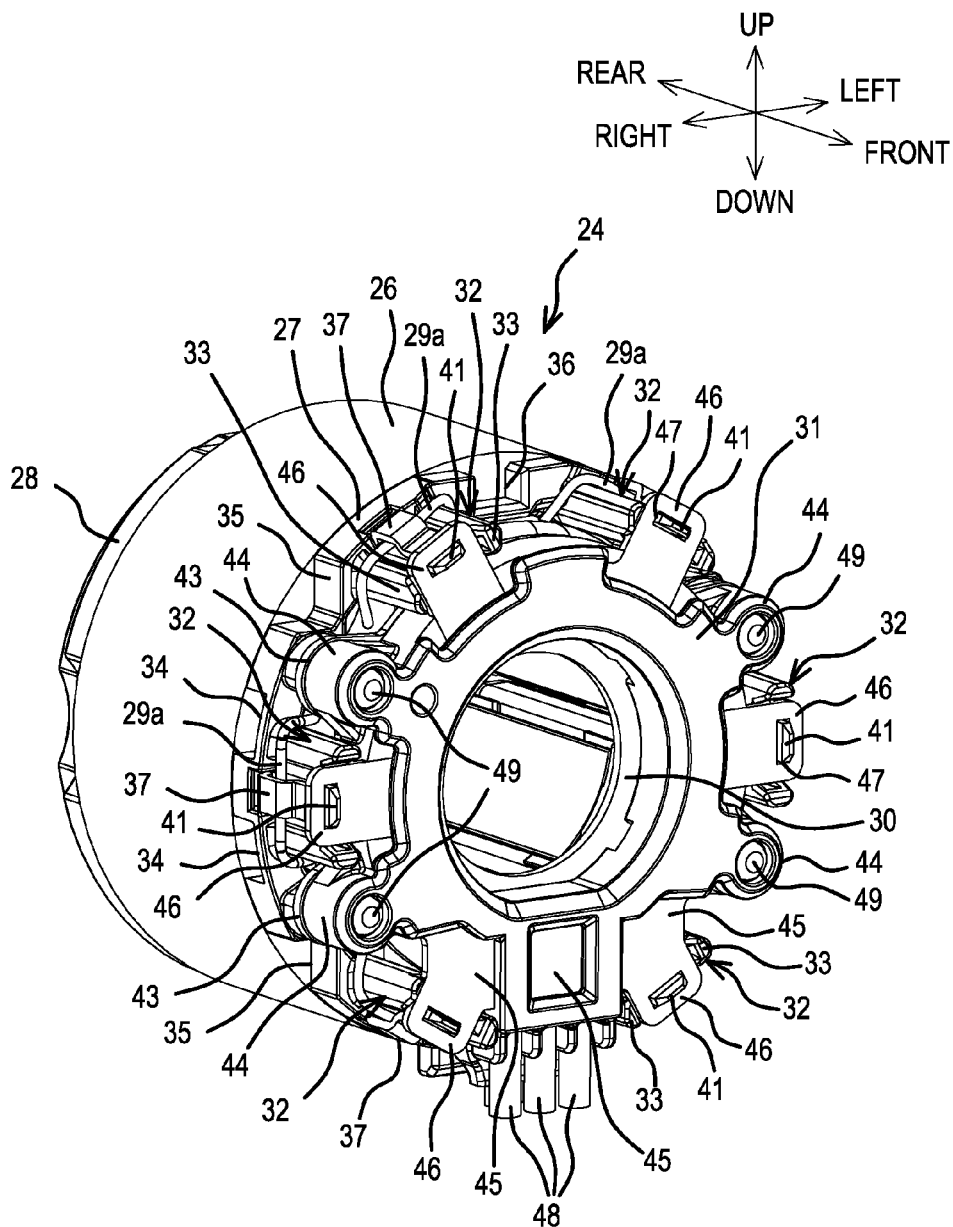
FIG. 2 is an oblique view of the stator of the driver-drill of FIG. 1, as viewed from the front.

The brushless motor 8, which is housed in a rear part of the main body housing 10, is an inner-rotor-type motor that includes a stator 24 at least partially surrounding a rotor 25. Furthermore, as shown in FIG. 2, the stator 24 has a tubular stator core 26 formed of a plurality of laminated steel sheets. A front insulator 27 and a rear insulator 28 are provided on the front and rear end surfaces of the stator core 26 in the axial direction, and six coils 29 are wound on the stator core 26 and through the front and rear insulators 27, 28. In addition, a sensor circuit board 30 and a short-circuiting member 31 are attached to the front insulator 27.

The front insulator 27 is a ring-shaped (annular), integrally molded article, the diameter of which is the same as the diameter of the stator core 26. Six sets of retaining parts 32 of fusing terminals 37, described below, protrude from a front surface of the front insulator 27. Each of the retaining parts 32 has a pair of projections 33 having grooves, and the projections are disposed at a prescribed spacing such that the grooves oppose one another. Screw bosses (not illustrated) protrude between each pair of adjacent retaining parts 32.

In addition, a pair of recessed parts 34 is formed on both the left and right sides of the front insulator 27, and a pair of triangular first notched parts 35 is formed on either side of the pair of recessed parts 34 such that the first notched parts 35 sandwich the recessed parts 34. Furthermore, a quadrangular second notched part 36 is formed at the center of an upper part of the front insulator 27.

The fusing terminals 37 are retained by the retaining parts 32 of the front insulator 27. As shown in FIGS. 3A-3E, each fusing terminal 37 is formed by folding a strip-shaped metal fitting back on itself, specifically, folding a first end part 38 of the strip-shaped metal fitting over a second end part 41 of the strip-shaped metal fitting. The first end part 38 includes a first folded part 39, which constitutes a protrusion, and a second folded part 40 folded back over the first folded part 39 such that it faces outward, at a tip side of the first end part 38. Wing pieces 42, which are L-shaped in cross section, are formed by folding both side edges of the second end part 41. When the folded sides of each of the fusing terminals 37 are inserted into a corresponding retaining part 32 and the wing pieces 42 are mated with the groove parts of the corresponding projections 33, the fusing terminals 37 are arranged along an imaginary circle and are disposed such that the first end parts 38 face radially outward and extend in a direction parallel to the axial direction of the front insulator 27.

Figure 3A:
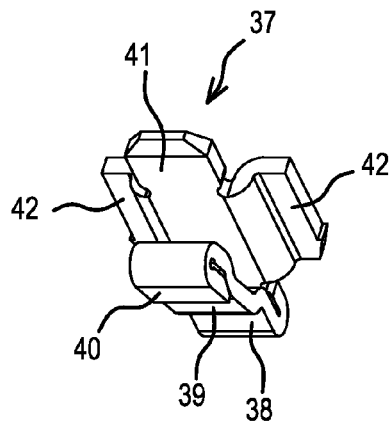
FIG. 3A is an oblique view of a first configuration of a fusing terminal for use in the stator of FIG. 2.
Figure 3B:
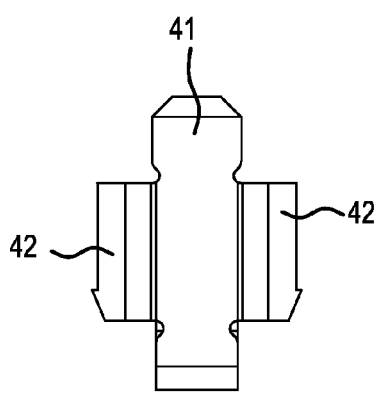
FIG. 3B is a rear elevational view of the fusing terminal of FIG. 3A.
Figure 3C:
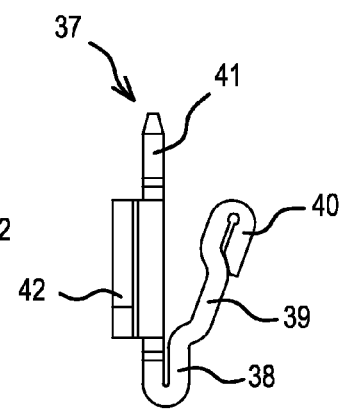
FIG. 3C is a side elevational view of the fusing terminal of FIG. 3A.
Figure 3D:
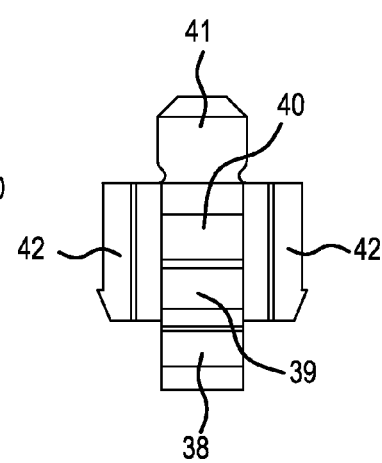
FIG. 3D is a front elevational view of the fusing terminal of FIG. 3A.
Figure 3E:
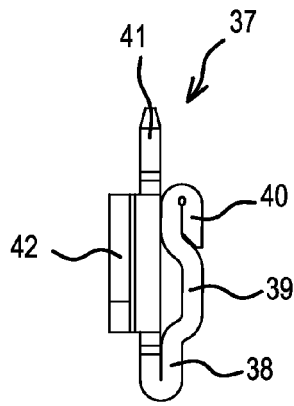
FIG. 3E is a side elevational view of the fusing terminal of FIG. 3A in a second configuration.

Each coil 29 is a single winding wire that is sequentially wound around each tooth of the stator core 26. The winding wire is electrically connected to each fusing terminal 37 by being fused (crimped or deformed radially inwardly) such that the winding wires 29a (i.e. portions of the single continuous winding wire), each of which connects respective adjacent coils 29, loop around the outer sides of the retaining parts 32 and are sandwiched (crimped or clamped) in the fusing terminals 37. As shown in FIG. 3E, the presence of the protruding first folded part 39 on the first end part 38 provides space between the first end part 38 and the second end part 41 for the insertion of the winding wire 29a. In addition, the formation of the second folded part 40 enables (ensures) reliable contact between the first and second end parts 38, 41, which in turn helps ensure stable fusing.

Referring now to FIG. 2, the sensor circuit board 30 is equipped with three rotation-detection devices (not shown), which detect the rotational positions of permanent magnets 53 on the rotor 25 and output rotation-detection signals. The sensor circuit board 30 is doughnut shaped (toroidal) and has an outer diameter that fits within the inner sides of the retaining parts 32. Four projections 43 extend from the outer circumference of the sensor circuit board 30, and each of the projections 43 has a through hole that corresponds to one of the screw bosses of the front insulator 27. Because the screw bosses extend through the through holes of the projections 43, the projections 43 are positioned at the front surface of the front insulator 27. Signal lines of the rotation detection devices are lead out from a lower part of the sensor circuit board 30.

The short-circuiting member 31 is ring shaped (annular), is made of resin, and has a diameter that is substantially the same as the diameter of the sensor circuit board 30. The short-circuiting member 31 includes four bosses 44 that project from the outer circumference thereof, and the screw bosses of the front insulator 27 can mate with the four bosses 44 from the rear. In addition, the short-circuiting member 31 includes three arcuate sheet-metal members 45, each of which comprises a pair of short-circuiting pieces 46 that project along a diagonal line (diametrically from each other). The sheet-metal members 45 are insert molded in the short-circuiting member 31 such that they are not in contact with one another and such that the short-circuiting pieces 46 are disposed on an imaginary circle around a common center. The short-circuiting pieces 46 protrude radially from the sheet-metal members 45 and correspond to the fusing terminals 37 retained by the front insulator 27. Slits 47 are formed at the tips of the short-circuiting pieces 46, and the second end parts 41 of the fusing terminals 37 are inserted into the slits 47. U-phase, V-phase, and W-phase power-supply lines 48 are respectively welded to the sheet-metal members 45.

The short-circuiting member 31 overlaps the sensor circuit board 30 from the front and the screw bosses of the front insulator 27 extend into the bosses 44 and the short-circuiting member 31 is affixed by screws 49. The second end parts 41 of the fusing terminals 37 are inserted into the corresponding short-circuiting pieces 46. If the fusing terminals 37 and the short-circuiting pieces 46 are then soldered, diametrically opposite pairs the fusing terminals 37 are short circuited by the sheet-metal members 45. That is, the fusing terminals 37 are electrically connected to the winding wires 29a between the coils 29, and pairs of coils 29 that are diagonally opposite one another are electrically connected by the three sheet-metal members 45, thereby forming a so-called parallel-winding delta connection.

Because the sensor circuit board 30 and the short-circuiting member 31 fit within the height dimension of the fusing terminals 37, the overall length of the brushless motor 8 can be kept small even if the short-circuiting member 31 and the like are used. Furthermore, except for the signal lines, the power-supply lines, and the like, all the members fit within the outer diameter of the stator core 26; consequently, the outer diameter of the product does not increase, and the product remains compact.

The thus-assembled stator 24 is positioned in the axial direction and in the circumferential direction in the main body housing 10 by support ribs 50 and projections (not shown). The projections 50 are circumferentially disposed on inner surfaces of the half housings 10a, 10b of the main body housing 10 such that they protrude from those inner surfaces. The projections protrude from the inner surfaces of the half housings 10a, 10b and are mated with the recessed parts 34 formed on the side surface of the front insulator 27. Furthermore, if the first notched parts 35 and the second notched part 36 are housed in a tubular housing that is used in a circular saw or the like, then the first notched parts 35 and the second notched part 36 can be used for positioning by mating them with ribs provided in the tubular housing.

Figure 4C:
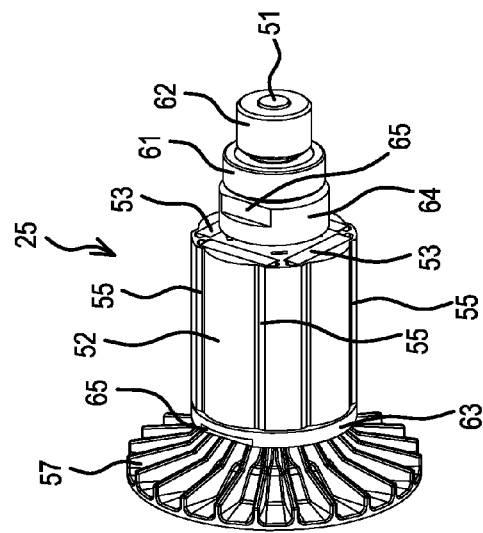
FIG. 4C is an oblique view of the rotor of FIG. 4A.
Figure 4A:
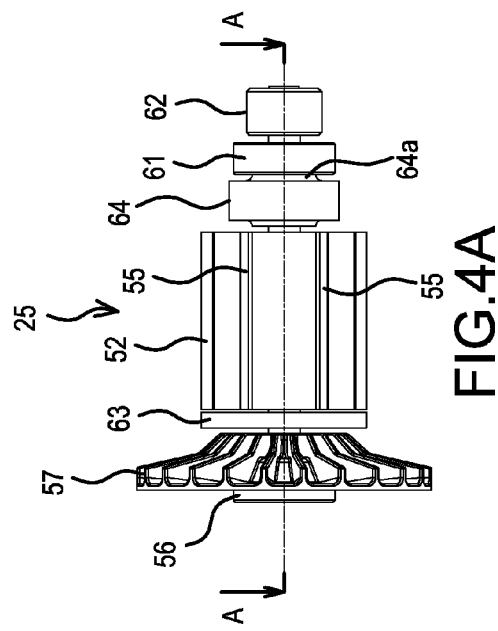
FIG. 4A is a side elevational view of a rotor for use with the stator of FIG. 2.
Figure 4B:
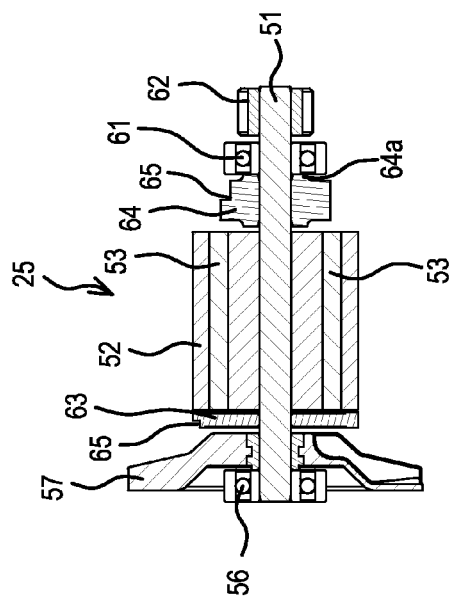
FIG. 4B is a sectional elevational view taken in the direction of line A-A in FIG. 4A.
Figure 5A:
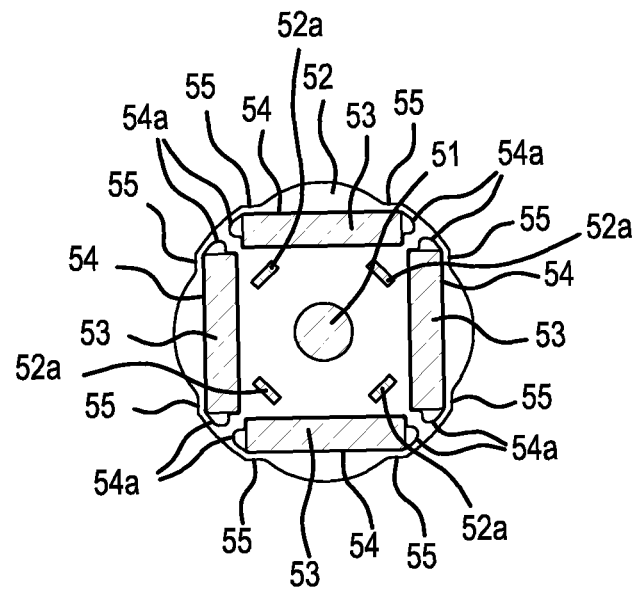
FIGS. 5A and 5B are transverse cross-sectional views of first and second rotors, each of which is independently usable with the stator of FIG. 2.

Referring now to FIGS. 4A-4C, the rotor 25 comprises a rotary shaft 51 that is located along the axial center of the rotor 25, and a generally cylindrical rotor core 52 that is disposed around the rotary shaft 51. The rotor core 52 comprises a stack of a plurality of steel plates (laminations), and four bar-shaped (sheet-shaped) permanent magnets (e.g., sintered magnets) 53 that are fixed to an inner part of the rotor core 52. As shown in FIG. 5A as well, the permanent magnets 53 are respectively mounted in through holes 54 that are formed in the rotor core 52. The through holes 54 are located, in a transverse cross section of the rotor core 52, at the four sides of a square centered on the rotary shaft 51, and they are affixed therein by an adhesive and/or by press fitting. Reference numerals 52a are oblong crimped or headed parts that affix the steel plates (laminations) of the rotor core 52 to one another, and they are located at the four corners of the square defined (surrounded) by the permanent magnets 53. This is electrically advantageous.

The rotor core 52 includes a plurality of chamfers or chamfer parts 55 that are parallel to the outer surfaces of the permanent magnets 53 and that serve as positioning parts or structures. The chamfer parts 55 are formed in the outer circumferential surface of the rotor core 52 and extend axially along the entire length of the rotor core 52. The chamfer parts 55 are located at positions that correspond, in a transverse cross section of the permanent magnets 53, to the outer sides of the permanent magnets 53 at both ends in the longitudinal directions. In other words, the chamfers extend generally along the narrow longitudinal edges of the permanent magnets 53.

The rear end of the rotary shaft 51 is pivotally supported by a bearing 56 that is held by the cap housing 13, and a centrifugal fan 57 is attached forward of the bearing 56. A center part of the centrifugal fan 57 bulges forward to form a cone shape, and the bearing 56 protrudes rearward from the center part. This configuration reduces the distance between the cap housing 13 and the centrifugal fan 57, resulting in a shortening of the overall length. Reference numerals 58 are exhaust ports that are formed on the left and right side surfaces of the cap housing 13, and air suction ports (not shown) are provided forward thereof on the side surfaces of the main-body housing 10.

A gear case 59, which houses the planetary-gear speed-reducing mechanism 9, is provided forward of the brushless motor 8, and the front end of the rotary shaft 51 is inserted through a cap 60. The cap 60 closes up a rear end of the gear case 59 and is pivotally supported by a bearing 61 held by the cap 60. A pinion 62 is fastened to that front end and meshes with a first-stage planetary gear of the planetary-gear speed-reducing mechanism 9.

The rotor 25 also includes a rear stopper 63 between the rotor core 52 and the centrifugal fan 57 and the rear stopper 63 serves as a stopper member. The rear stopper 63 is preferably made of brass and is formed as a disc having an outer diameter that is the same as that of the rotor core 52. The rear stopper 63 is fastened to the rotary shaft 51 coaxially with the rotor core 52. A front stopper 64 is provided between the rotor core 52 and the bearing 61 on the front side, and the front stopper 64 also serves as a stopper member. The front stopper 64 is made of brass and is formed as a disc that has an outer diameter smaller than that of the rotor core 52. The front stopper 64 is fastened to the rotary shaft 51 coaxially with the rotor core 52 and such that the front stopper 64 and the rotor core 52 are spaced apart. However, the outer diameter of the front stopper 64 is larger than an imaginary circle defined (surrounded) by the (radially) inner sides of the four permanent magnets 53, and the front stopper 64 is located forward of the permanent magnets 53. In addition, the front stopper 64 has a stepped shape with a greater wall thickness in an area around its center opening than in an area radially outward of the center opening, that is, around the outer circumference of the front stopper 64. In addition, when installed on the rotary shaft 51, a front surface of a thick-walled part 64a of the front stopper 64 around the center opening only contacts an inner ring of the bearing 61, and thus avoids interfering with an outer ring of the bearing 61.

Notches 65 for adjusting balance are formed in the outer circumferences of the rear stopper 63 and the front stopper 64. However, if the rotor is prebalanced during manufacture, then there is no need to provide the notches.

In a hammer driver-drill 1 as configured as described above, squeezing the trigger 21 closes a switch and causes the brushless motor 8 to be driven by current (power) supplied from the battery pack 5. A microcontroller (microprocessor) of a controller (not illustrated), which is housed in the lower part of the handle 3, acquires information about the rotational state of the rotor 25 by obtaining rotation-detection signals that indicate the positions of the permanent magnets 53 of the rotor 25. These rotation-detection signals are output from the rotation-detection devices of the sensor circuit board 30. The microcontroller of the controller controls the ON/OFF state of each of the switching devices in accordance with the information about the rotational state, and the rotor 25 is thus rotated by the sequential supplying of electric current to each of the coils 29 of the stator 24. The rotary shaft 51 thus rotates, and the rotary motion of the shaft, the speed of which is reduced by the planetary-gear speed-reducing mechanism 9, is transmitted to the spindle to rotate the chuck 19. Operation (rotation) of the mode-switching ring 17 enables the selection of a driving mode in which a clutch mechanism blocks the transmission of rotary motion when a set torque is reached, a drilling mode in which the clutch mechanism does not function, or a hammer mode in which the spindle reciprocates forward and rearward while rotating. Furthermore, operation (rotation) of the clutch-adjusting ring 18 sets the torque at which the clutch mechanism begins to operate in the driving mode.

Because the rear stopper 63 and the front stopper 64 are provided at the front and the rear of the rotating rotor 25, respectively, (axial) movement of each permanent magnet 53 in the front-rear direction is restricted. This at least substantially prevents the permanent magnets 53 from falling out of the through holes 54 of the rotor core 52, and the brushless motor 8 can be used with high reliability. In particular, utilization of the rear stopper 63 prevents any leakage of the adhesive that is used to secure the permanent magnets 53 in the rotor core 52, and this helps ensure a sufficient adhesion surface area for the permanent magnets 53 and results in improved productivity. In addition, forming the notches 65 in the front and rear stoppers 63, 64 makes it easy to correct the balance of the front and rear stoppers 63, 64. With reference to FIG. 5A, spaces (gaps, grooves) 54a are provided in the sides of the through holes 54 along the narrow longitudinal sides of the permanent magnets 53 to accommodate adhesive, and this helps to more securely retain the permanent magnets 53 in the through holes 54.

The plurality of chamfer parts 55 on the outer circumferential surface of the rotor core 52 allow the rotor core to be securely held in a desired position or orientation when the permanent magnets 53 are inserted into the through holes 54 of the rotor core 52 during the manufacture. Holding the rotor core 52 in this manner facilitates the insertion of the permanent magnets 53, and a reduction in cost can be expected as a result of the simplification of the manufacturing process. In addition, because the disclosed configuration eliminates the need to create positioning pin holes or the like in the inner surface of the rotor core 52, it becomes possible to provide benefits such as, for example, reducing the size of the rotor core 52, or allowing a rotary shaft having a large diameter to be used, and the like. Furthermore, because the transverse cross section of the rotor core 52 is not a true circle, torque ripple (the torque fluctuation range) is reduced, and the flow of the magnetic flux is smoothed.

Furthermore, the front stopper and the rear stopper are not limited to the shapes mentioned above, and their shapes can be modified where appropriate. For example, if the sensor circuit board is on the rear side of the rotor core, the shapes of the front and rear stoppers may be reversed. In addition, if the front surface of the rear stopper, the surface that opposes the end surface of the rotor core, is concave, or if the rear stopper is formed to be U-shaped in longitudinal cross section, that is, such that the outer circumference is greater toward the front, then the end surface of the rotor core can be reliably enclosed even if the end surface of the rotor core bulges rearward. If a concave surface, the U-shape, or the like is formed in both the front and rear surfaces, then directionality will be eliminated, thereby eliminating assembly errors. Furthermore, a fin may be formed integrally with the rotor, which would improve the heat dissipation characteristics of the rotor. In the case of a nonmagnetic body, the material is not limited to brass, and it can also be formed with stainless steel or the like.

Figure 5B:
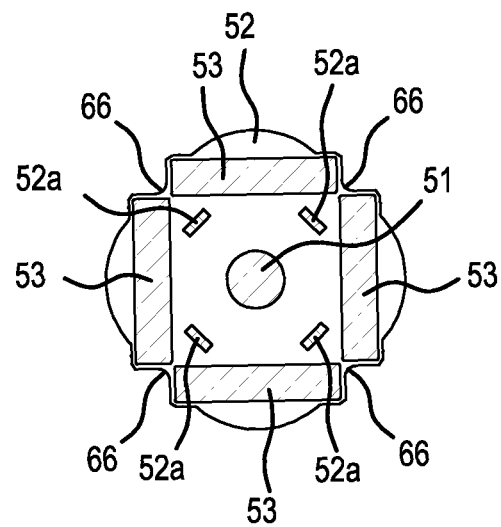

Moreover, the number, position, and configuration of the chamfer parts 55 provided on the rotor core 52 of the brushless motor 8 are not limited to the abovementioned embodiment and can be modified where appropriate. In addition, the shape of the positioning parts is also not limited to that of the disclosed chamfer parts and can be modified where appropriate. For example, as shown in FIG. 5B, the positioning parts may be recessed grooves 66 that are V-shaped (or L-shaped) in cross section and that are formed between the permanent magnets 53. For example, the grooves 66 may have mutually perpendicular side walls. Of course, the number, the position, and the like of the recessed grooves 66 may also be modified. Furthermore, it is also possible to provide positioning parts in the form of ridges or similar structures that protrude from the circumferential surface of the rotor core as long as those positioning parts do not interfere with the stator 24.

Furthermore, the positioning parts are not limited to being located on the rotor core, and it is also possible to provide the positioning parts on the fan, to provide a separate positioning member on the rotary shaft, or the like.

Figure 6B:
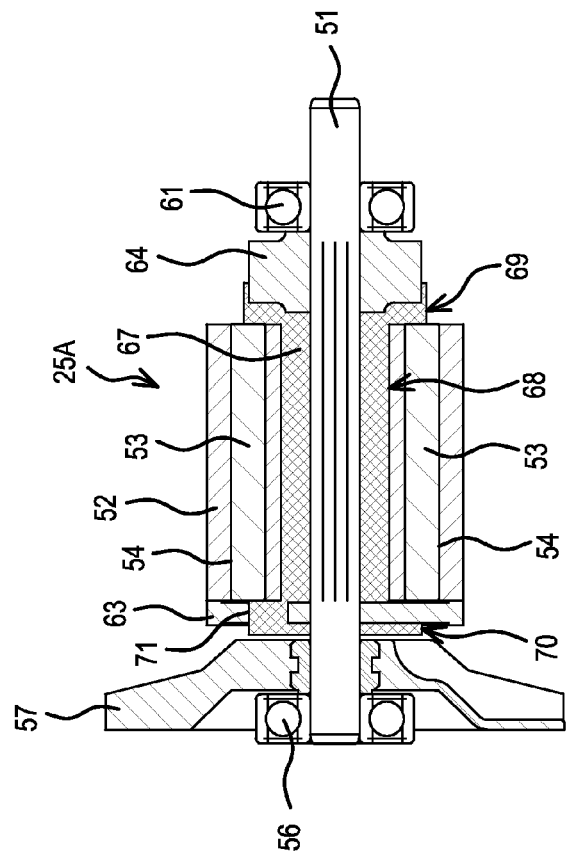
FIG. 6B is a longitudinal cross-sectional view of the rotor of FIG. 6A.
Figure 6A:
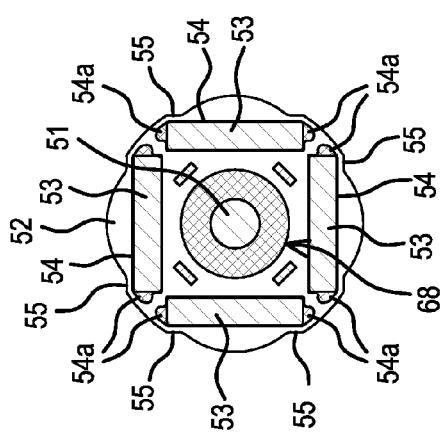
FIG. 6A is a transverse cross-sectional view of a rotor integrally molded with resin.
Figure 6C:
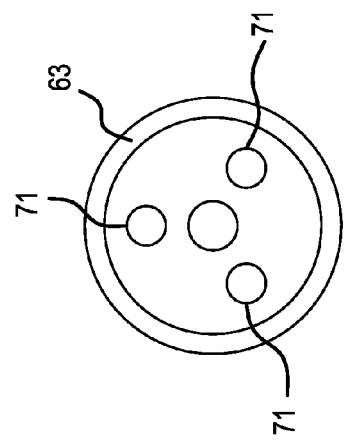
FIG. 6C is a rear elevational view of a rear stopper of the rotor of FIG. 6A.

In addition, it is also possible to utilize an integral resin molding method with resin to affix the permanent magnets in the rotor. For example, as shown in FIGS. 6A-6C, the permanent magnets 53 are secured in the rotor 25A by filling the spaces 54a, 54a formed along two side edges of the permanent magnets 53 in the through holes 54 with resin 67 (crosshatched portion in FIGS. 6A and 6B). Moreover, this integral molding method is not limited to fixing the permanent magnets 53; for example, the permanent magnets 53 may also be integrally molded with each of the front and rear stoppers 63, 64. This can be accomplished by making the inner diameter of the rotor core 52 larger than the diameter of the rotary shaft 51 and by filling a space 68 between the rotary shaft 51 and the rotor core 52 with the resin 67. A space 69 between the rotor core 52 and the front stopper 64 and a space 70 between the rear stopper 63 and the centrifugal fan 57 are also filled with the resin 67. The space 69 communicates with the spaces 54*a*, and the space 70 communicates with the space 68 via relief holes 71 formed concentrically in the rear stopper 63, as shown in FIG. 6C.

Thereby, according to the example in FIGS. 6A-6C, the rotor core 52 and the permanent magnets 53, as well as the rotary shaft 51 and the front and rear stoppers 63, 64, are integrated (made integral, bonded together) by the resin 67, and this makes the rotor 25A stronger than when adhesive is used. This increased strength may allow the rotor to operate at higher rotational speeds. In addition, integrally molding the front and rear stoppers 63, 64 makes it possible to correct balance using high-density brass and the like, which results in a reduction of vibration.

Furthermore, instead of using a resin to hold the permanent magnets 53 in the through openings 54, it is also possible to secure permanent magnets 53*a* in the through holes 54 using an injection moldable magnet material 72, e.g., a powdered magnetic material in a suitable binder. FIGS. 7A and 7B show one example of such an arrangement. In FIGS. 7A and 7B a rotor 25B includes permanent magnets 53*a* that are smaller than the through holes 54. However, the space between the permanent magnets 53*a* and the inside walls of the through holes 54 is filled with injection moldable magnet material 72 to hold the permanent magnets 53*a* in place. The injection moldable magnet material 72 also secures the front and rear stoppers 63, 64 in the same manner as the resin discussed above. That is, the permanent magnets 53*a* are placed inside the respective through holes 54 of the rotor core 52, and the space around the permanent magnets 53*a* is filled with the injection moldable magnet material 72. The injection moldable magnet material 72 fills the space 69 that is formed between the rotor core 52 and the front stopper 64 and the space 70 that is formed between the rear stopper 63 and the centrifugal fan 57 and thus secures the front stopper 64 and the rear stopper 63 to the rotor core 52.

In this manner, according to the example shown in FIGS. 7A and 7B, the same effect obtained by integral molding with resin can be obtained, and the strength of the rotor 25B will be greater than that of a rotor in which adhesive is used, thereby allowing for operation at higher rotational speeds. The integral molding of the front and rear stoppers 63, 64 also reduces vibration. In addition, using the injection moldable magnet material 72 allows for the use of smaller (lower volume) sintered magnets, which, because the sintered magnets are expensive, also results in a reduction in cost.

Figure 8B:
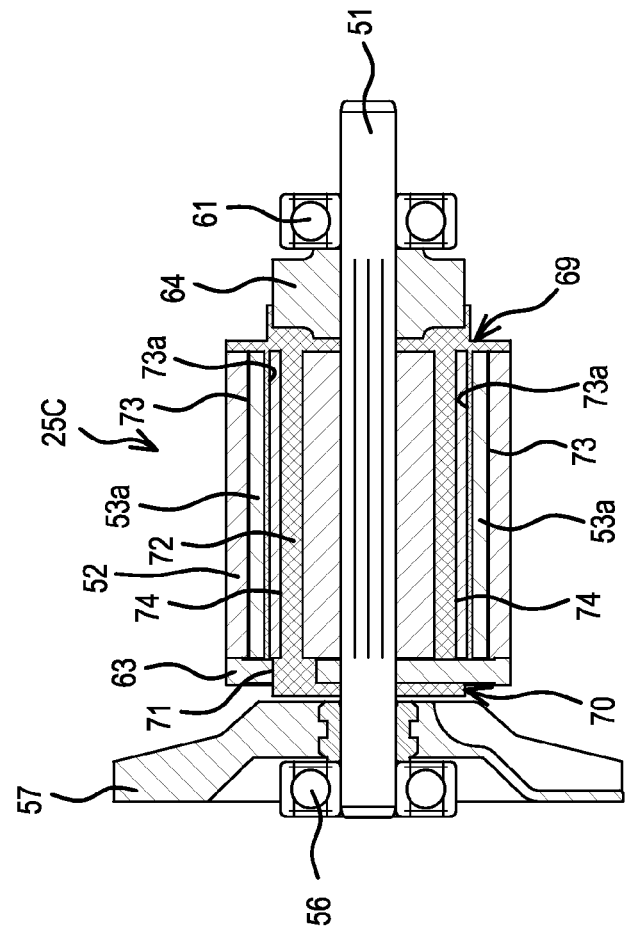
FIGS. 8A and 8B are a transverse cross-sectional view of another example of a rotor integrally molded with injection molded magnet material and a longitudinal cross-sectional view of the rotor, respectively.
Figure 8A:
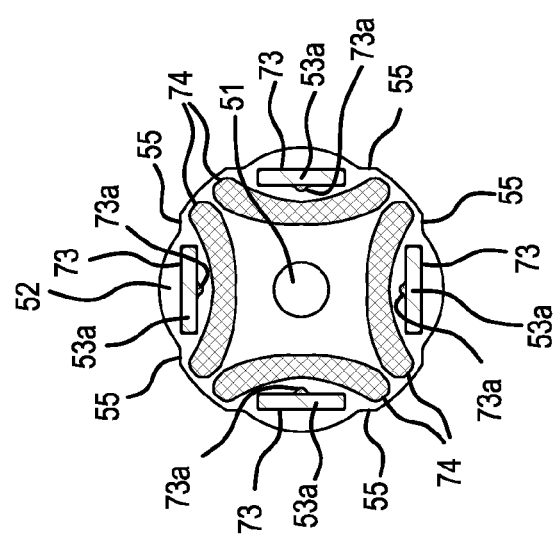

In addition, FIGS. 8A and 8B show another example that employs injection-moldable magnet material. In these figures, a rotor core 52 of a rotor 25C includes first through holes 73 into which small, sheet-shaped (bar-shaped) permanent magnets 53*a* are inserted, and second through holes 74, positioned radially inward thereof (on the inner sides/rotary shaft side thereof). As in FIG. 5A, the first through holes 73 are formed such that they are positioned along the sides of an imaginary quadrangle centered on the rotary shaft 51; a groove 73*a* is provided on an inner side and in the center in the longitudinal direction of each first through hole 73 such that it is continuous therewith and protrudes toward the center. Each second through hole 74 is arcuately formed and has two ends, one at each end of the corresponding first through hole 73, and the center of the second through hole 74 bulges radially inward where it extends past the inner side of the corresponding first through hole 73.

In this embodiment, the permanent magnets 53*a* and each of the front and rear stoppers 63, 64 are integrally molded using injection-moldable magnet material 72. Specifically, after setting (placing) the (solid) permanent magnets 53*a* inside the respective first through holes 73, the injection moldable magnet material is injected into (i) the grooves 73*a* of the first through holes 73, (ii) the interior of the second through holes 74, (iii) the space 69 that is formed between the rotor core 52 and the front stopper 64, which space 69 communicates with both of the through holes 73, 74, and (iv) the space 70 that is formed between the rear stopper 63 and the centrifugal fan 57, which space 70 communicates with the relief holes 71 of the rear stopper 63.

In this manner, the embodiment shown in FIGS. 8A and 8B also obtains the same effects as previous embodiments employing injection moldable material, namely, the strength of the rotor 25C is higher than when adhesive is used, and a higher rotational speed can be achieved, and vibration is reduced by virtue of the integral molding of the front and rear stoppers 63, 64. In addition, smaller sintered magnets can be used, which, because sintered magnets are expensive, also results in a reduction in cost.

Figure 9B:
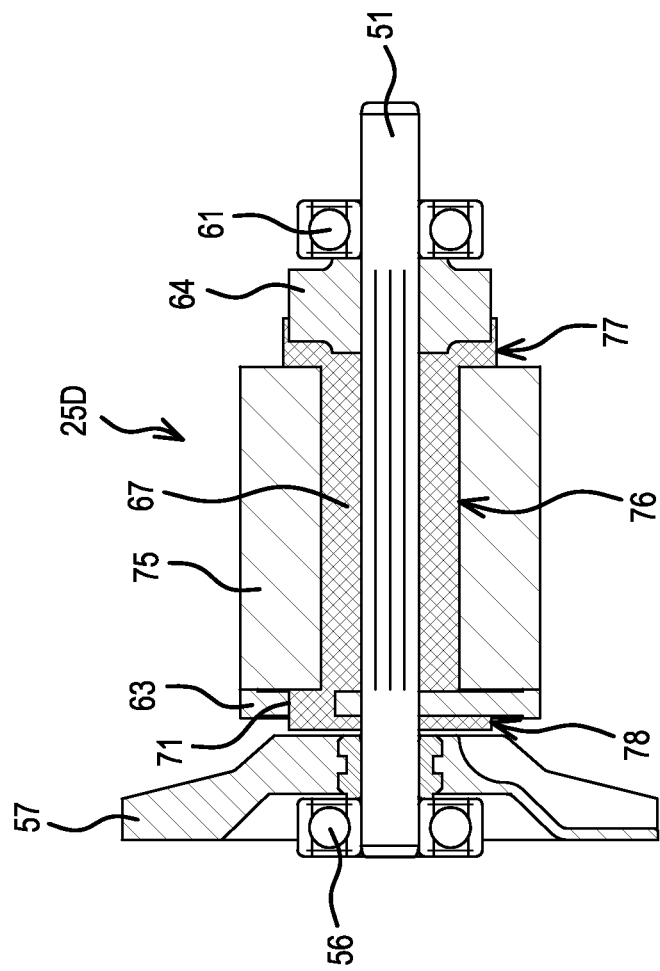
FIGS. 9A and 9B are a transverse cross-sectional view of a rotor integrally molded with resin in an SPM motor and a longitudinal cross-sectional view of the rotor, respectively.
Figure 9A:
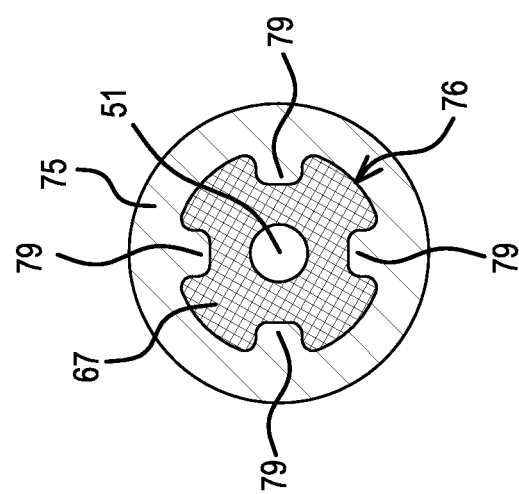

Moreover, the above-mentioned embodiments are directed to an interior permanent magnet (IPM) type motor in which the permanent magnets are embedded in the rotor; however, integral molding with resin is possible even in the case of a surface permanent magnet (SPM) motor wherein one or more magnets are provided on the surface of the rotor. FIG. 9 shows one example of such a rotor, 25D, which is integrally molded by injecting a resin 67 into a space 76 between a tubular permanent magnet 75 provided on the outer circumference of the rotor 25D and the rotary shaft 51. The resin is also injected into a space 77 between the permanent magnet 75 and the front stopper 64, and into a space 78 between the rear stopper 63 and the centrifugal fan 57, which space 78 communicates with the space 76 via the relief holes 71 of the rear stopper 63. The embodiment also includes a plurality of radially inward extending projections 79 on the inner circumference of the permanent magnet 75 that run in the axial direction and are equidistantly circumferentially spaced and have a concave-convex shape in a transverse cross section.

In the example shown in FIG. 9 as well, the permanent magnet 75, the rotary shaft 51, and the front and rear stoppers 63, 64 are integrated (made integral) by the resin 67, and therefore the strength of the rotor 25D is higher than when adhesive is used, and a higher rotational speed can be achieved. In particular, integrally molding the front and rear stoppers 63, 64 makes it possible to correct balance by using, for example, high-density brass, which results in a reduction in vibration. In addition, the concave-convex shape of the permanent magnet 75 makes it possible to easily stop rotation, which results in a reduction in manufacturing cost.

The present teachings are not limited to a hammer driver-drill and can be adapted to other types of power tools, such as a power drill, an impact driver, a reciprocating saw, a circular saw, a grinder, and the like, as long as it is a power tool in which a brushless motor is used as the drive source. In such cases, instead of a battery, the drive source may be, for example, alternating current (AC).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools and brushless motors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Hammer driver-drill
2 Main body
3 Handle
8 Brushless motor
10 Main-body housing
24 Stator
25, 25A-25D Rotors
26 Stator core
29 Coil
30 Sensor circuit board
31 Short-circuiting member
37 Fusing terminal
45 Sheet-metal member
51 Rotary shaft
52 Rotor core
53, 53a, 75 Permanent magnets
54 Through hole
55 Chamfer part
63 Rear stopper
64 Front stopper
65 Notch
66 Recessed groove
67 Resin
71 Relief hole
72 Injection-molded magnet
73 First through hole
74 Second through hole

The invention claimed is:

1. A power tool comprising a housing and a brushless motor, the brushless motor including a stator and a rotor disposed inside the housing, the rotor including a rotor core having a plurality of axially extending through holes and a permanent magnet disposed in each of the plurality of through holes,
wherein:
the rotor includes a plurality of axially extending concavities in an outer surface of the rotor by which the rotor core is holdable in a desired circumferential orientation while the permanent magnets are inserted into the through holes and at least one convexity located between an adjacent pair of the concavities,
the rotor core viewed in cross section perpendicular to the axis of rotation comprises first and second pairs of opposed arc sections, each of the arc sections having a longest chord,
the adjacent pair of concavities is located on the outer surface of the rotor between circumferentially adjacent arc sections of the first and second pairs of arc sections, and
each of the permanent magnets has a width greater than a length of the longest chord.

2. The power tool according to claim 1, wherein each of the concavities has first and second mutually perpendicular, axially extending walls.

3. The power tool according to claim 1, wherein portions of the permanent magnets extend into the convexities.

4. The power tool according to claim 1, wherein the rotor core is formed from a plurality of laminations and wherein the permanent magnets are retained in the through holes by an injection molded resin body.

5. The power tool according to claim 1, wherein the rotor core is formed from a plurality of laminations and wherein the permanent magnets are retained in the through holes by a body of injection molded magnet material.

6. The power tool according to claim 1, wherein each of the plurality of magnets is located adjacent one of the longest chords and is located radially inward of the respective adjacent longest chord.

7. The power tool according to claim 1, wherein:
each of the plurality of magnets includes a radially outer wall,
the radially outer walls of the plurality of magnets lie on a side of a regular convex polygon and
each of the sides of the regular convex polygon extends along the outer wall of one of the plurality of magnets.

8. The power tool according to claim 7 wherein the regular convex polygon is a square.

9. The power tool according to claim 7, wherein the regular convex polygon extends beyond the outer surface of the rotor.

10. The power tool according to claim 9, wherein the regular convex polygon is a square.

11. A power tool comprising:
a housing; and
a brushless motor in the housing, the brushless motor including a stator, a rotor having a longitudinal axis of rotation and a rotor core having a plurality of axially extending through holes, and a permanent magnet in each of the plurality of through holes,
the rotor core having a radially outer surface, the radially outer surface being non-circular when viewed in cross section perpendicular to the axis of rotation,
wherein the outer surface includes at least two axially extending concavities by which the rotor core can be held in a desired circumferential orientation while the permanent magnets are inserted into the through holes,
wherein the rotor core viewed in cross section perpendicular to the axis of rotation comprises first and second pairs of opposed arc sections, circumferentially adjacent arc sections of the first and second pairs of arc sections being separated by one of the at least two axially extending concavities,
and further including at least one convexity between the concavities and between the circumferentially adjacent arc sections of the first and second pairs of arc sections, wherein portions of the permanent magnets extend into the convexities.

12. The power tool according to claim 11, wherein each of the concavities has first and second mutually perpendicular, axially extending walls.

13. The power tool according to claim 11, wherein the core is formed from a plurality of laminations and wherein the permanent magnets are retained in the through holes by an injection molded resin body.

14. The power tool according to claim 11, wherein the core is formed from a plurality of laminations and wherein the permanent magnets are retained in the through holes by a body of injection molded magnet material.

15. A power tool comprising:
a housing and
a brushless motor, the brushless motor including a stator and a rotor disposed inside the housing, the rotor including a rotor core having a plurality of axially extending through holes and a permanent magnet disposed in each of the plurality of through holes,
wherein:
the rotor includes a plurality of axially extending concavities in an outer surface of the rotor by which the rotor core is holdable in a desired circumferential orientation while the permanent magnets are inserted into the through holes,
the rotor further includes at least one convexity located between an adjacent pair of the concavities,
the rotor core viewed in cross section perpendicular to the axis of rotation comprises first and second pairs of opposed arc sections, each of the arc sections having a longest chord,
the adjacent pair of concavities are located on the outer surface of the rotor between circumferentially adjacent arc sections of the first and second pairs of arc sections,
each of the plurality of magnets is located adjacent one of the longest chords and is located radially inward of the respective adjacent longest chord,
each of the plurality of magnets includes a radially outer wall, the radially outer walls of the plurality of magnets lying on a side of a regular convex polygon,
each of the sides of the regular polygon extends along the outer wall of one of the plurality of magnets, and
the regular convex polygon extends beyond the outer surface of the rotor.

16. The power tool according to claim 15, wherein the regular convex polygon is a square.

17. The power tool according to claim 16, wherein each of the permanent magnets has a width greater than a length of the longest chord.

18. The power tool according to claim 15, wherein each of the concavities has first and second mutually perpendicular, axially extending walls.

19. The power tool according to claim 15, wherein the rotor core is formed from a plurality of laminations and the permanent magnets are retained in the through holes by an injection molded resin body.

20. The power tool according to claim 15, wherein the rotor core is formed from a plurality of laminations and the permanent magnets are retained in the through holes by a body of injection molded magnetic material.

* * * * *